May 3, 1966 W. E. BAKER 3,249,896
FREQUENCY-SHIFT DATA TRANSMITTER
Filed Nov. 1, 1963
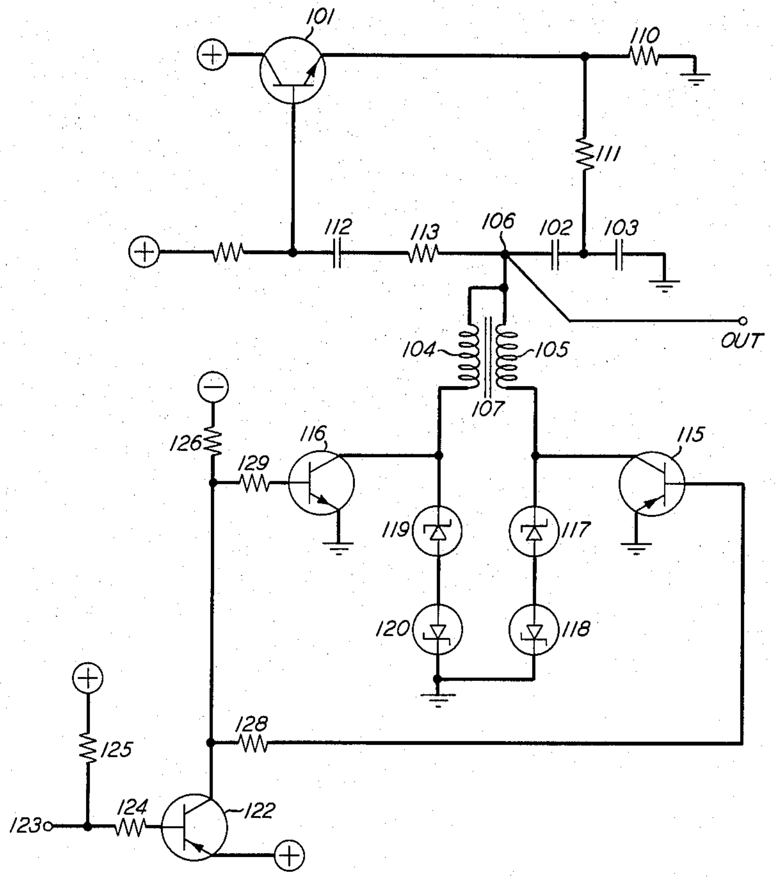
INVENTOR
W. E. BAKER
BY R C Lipton
ATTORNEY 3,249,896
Patented May 3, 1966

3,249,896

FREQUENCY-SHIFT DATA TRANSMITTER

William E. Baker, Middletown, N.J., assignor to Bell Telephone Laboratories, Incorporated, New York, N.Y., a corporation of New York Filed Nov. 1, 1963, Ser. No. 320,791
6 Claims. (Cl. 332—14)

This invention relates to a frequency-shift oscillator circuit and, more particularly, to a transmitting circuit for converting binary data signals to frequency-shift signals.

A broad object of this invention is to provide an improved frequency-shift signal transmitter.

Data transmission sets, arranged to communicate by voice frequency signals, can be interconnected by way of conventional telephone lines. The data transmitter preferably includes a frequency-shift oscillator to convert the binary data signals to frequency-shift signals within the voice frequency band. To accomplish the shift of the signal frequency in accordance with the binary data signals, electronic switching devices are employed to switch reactance elements into and out of the oscillator tank circuit. A discriminator in the remote data receiver then detects the received signals and reconverts them to the original binary data bits. Switching the reactance of the tank circuit, however, tends to shift the phase of the oscillating wave in addition to shifting the frequency. Since the receiver discriminator is phase sensitive, the phase discontinuity results in a distortion of the binary elements transitions, sometimes called jitter.

It is an object of this invention to reduce the phase shift accompanying the oscillator frequency shift.

In accordance with the present invention, the oscillator tank circuit includes a capacitive circuit and two mutually coupled coils wound on a common core. A pair of transistor switches simultaneously switches one coil into the tank circuit and the other coil out of the tank circuit in response to the binary data signal transitions. Thus the capacitive circuit and the common core are not effected by the switching of the coils and the energy level of the tank circuit is maintained, assuming simultaneous switching. Under these conditions, it has been discovered that phase continuity is maintained when the frequency of the wave is shifted. Since the transistor switches cannot operate in exact coincidence, both coils may be open circuited for a finite interval during the signal transition. The energy loss during this interval due to voltage build up in the coils may be substantially eliminated, however, by connecting the voltage breakdown devices across the transistor switches.

The foregoing and other objects and features of this invention will be more fully understood from the following description of an illustrative embodiment thereof taken in conjunction with the accompanying drawing, the single figure of which shows, in schematic form, the details of a frequency-shift data transmitter in accordance with this invention.

Referring now to the drawing, a transistor oscillator which includes transistor 101 is shown. The resonant circuit of the oscillator includes capacitors 102 and 103, which capacitors are connected in series between ground and terminal point 106 to form a capacitor voltage dividing network. Connected in parallel to capacitors 102 and 103 are inductive coils 104 and 105, which are tightly coupled on core 107. The parallel path of coil 104 may be traced from terminal point 106 through the coil 104 and the collector-to-emitter path of transistor 116. Similarly, the path from terminal point 106 through coil 105 and the collector-to-emitter path of transistor 115 connects coil 105 in parallel with capacitors 102 and 103.

The emitter of transistor 101 is connected to ground by way of resistor 110 and to the junction of capacitors 102 and 103 by way of resistor 111. The base of transistor 101 is connected to terminal point 106 by way of capacitor 112 and resistor 113.

With the base of transistor 101 connected to terminal point 106, transistor 101 is driven by an alternating voltage wave determined by the resonant circuit. The emitter connection through resistor 111 provides the regenerative feedback to sustain the oscillations of the resonant circuit. Accordingly, a sine wave output may be obtained from terminal point 106, for example, having a frequency determined by the natural oscillating frequency of the resonant circuit.

The oscillating frequency of the resonant circuit is determined by capacitors 102 and 103 and either of coils 104 or 105, which coils are alternately connected across the tank circuit capacitors, as described hereinafter. As previously described, coil 104 is connected in series with the collector-to-emitter path of transistor 116 and coil 105 is connected in series with the collector-to-emitter path of transistor 115. The bases of transistors 115 and 116 are, in turn, coupled respectively through base resistors 128 and 129 to the collector of transistor 122 and to negative battery by way of resistor 126. The base of transistor 122 is coupled through resistor 124 to positive battery by way of resistor 125 and to input terminal 123.

In frequency-shift transmission systems, the input direct current data may comprise data bits constituting open and ground pulses. When an open pulse is applied to terminal 123, the base of transistor 122 is rendered positive by the application of positive battery by way of resistors 125 and 124. A back bias is thus placed across the emitter-to-base path of transistor 122 and the transistor cannot conduct. This permits the application of negative battery to the bases of transistors 115 and 116 by way of resistor 126. Transistor 115 is rendered conductive upon the application of the negative battery to its base and transistor 116 is turned OFF with negative battery applied to the base. With transistor 115 turned ON, coil 105 is connected by way of the collector-to-emitter path of transistor 115 across capacitors 102 and 103, as previously described. Thus, with an open pulse applied to terminal 123, coil 105 is connected into the oscillator tank circuit.

When a ground pulse is applied to terminal 123, the ground extending through resistor 124 to the base of transistor 122 renders the transistor conductive. Positive battery is thus applied by way of the emitter-to-collector path of transistor 122 to the bases of transistors 115 and 116. Transistor 115 is thus rendered nonconductive, disconnecting the previously-described path connecting coil 105 to the tank circuit. The application of the positive battery to the base of transistor 116 renders this transistor conductive and coil 104 is thus connected across capacitors 102 and 103 by way of the emitter-to-collector path of transistor 116. It is thus seen that the application of an open pulse to terminal 123 connects coil 105 through the tank circuit and the application of a ground pulse to terminal 123 disconnects coil 105 and connects coil 104 through the tank circuit. Accordingly, the oscillating frequency of the resonant circuit is shifted by the alternate connection of coils 104 and 105 across capacitors 102 and 103.

Coils 104 and 105 are tightly coupled together on core 107, as previously described, to reduce jitter due to phase shift which occurs when the coil connecting paths are transferred. Since the output generated comprises a sine wave before and after switching, the instantaneous voltage $V_i$ of either wave depends on the peak voltage $V_p$ of the wave and its phase angle $\theta$.

$$V_i = V_p \cos \theta \qquad (1)$$

Since capacitors 102 and 103 are always connected across the tank circuit, the instantaneous voltage before and after switching must necessarily be continuous. The wave equations, therefore, before and after switching can thus be related.

$$V_{p1} \cos \theta_1 = V_{p2} \cos \theta_2 \quad (2)$$

where $V_{p1}$ and $V_{p2}$ are the peak voltages before and after switching and $\theta_1$ and $\theta_2$ are the phase angles before and after switching, respectively.

The peak voltage of the tank circuit is a function of the total energy E in the tank.

$$V_p = \sqrt{\frac{2E}{C}} \quad (3)$$

The energy of the tank circuit, however, is stored in the capacitors, designated herein as capacitors 102 and 103, and in the transformer core, shown in the drawing as core 107. Since the capacitor is maintained in the circuit and the switching from one coil, such as coil 104, to the other coil, such as coil 105, maintains core 107 in the circuit, the total energy is unaffected by the switching, and the peak voltage prior to switching is necessarily the same as the peak voltage after switching. Accordingly, the present embodiment yields instantaneous voltage continuity and the peak voltage continuity and thereby obtains:

$$\cos \theta_1 = \cos \theta_2 \quad (4)$$

$$\theta_1 = \theta_2 \quad (5)$$

It is thus seen that at the instant of switching, the phase angle for each wave is the same. Accordingly, the reduction of jitter and especially distortion due to the phase shift during the switching sequence, is substantially eliminated, assuming simultaneous switching of the tank coils.

Transistor switches 115 and 116 do not switch coincidentally, however, due, for example, to the finite rise time of the signal applied in common to their bases. During the finite interval that the signal goes from negative to positive, transistor 115 turns OFF when the signal approaches ground and transistor 116 thereafter turns ON when the signal goes positive relative to ground. Accordingly, the paths connecting coils 104 and 105 to the tank circuit are opened simultaneously the magnetic field set up by the coil 105 which was previously connected to the tank circuit starts to collapse, and the voltages at the collectors of transistors 115 and 116 start to rise. A tank energy loss thus results depending upon the collector voltage $V_c$ the coil current $I_t$ at the time of switching and the interval $T_0$ both transistors are OFF.

$$E_{(\mathrm{Loss})} \cong V_c I_t T_0 \quad (6)$$

Thus, it can be seen that the energy lost is minimized by maintaining the collector voltage at a low level. This is accomplished by connecting oppositely-poled Zener diodes 117 and 118 across the collector-to-emitter path of transistor 115 and connecting oppositely-poled Zener diodes 119 and 120 across the collector-to-emitter path of transistor 116. Accordingly, Zener diode 119 or 120, for example, will break down, completing a low impedance path across the collector-to-emitter path of transistor 116 if the positive or negative voltage at the collector of transistor 116 exceeds the breakdown voltage of the respective diode.

The breakdown voltage of the Zener diodes is chosen to be as low as possible without allowing it to interfere with the normal operation of the tank circuit during other intervals. Since the normal voltage across the connected coil equals the tank voltage, the voltage across the other coil is related thereto in accordance with the turns ratio $n_2/n_1$ of the two coils. The normal voltage at the collector of the nonconducting transistor, and consequently the minimum breakdown voltage, is dependent on the tank voltage less the voltage across the coil, $$V_{z(\mathrm{Min})} = V_t - V_t n_2/n_1 \quad (7)$$

where $V_t$ is the peak tank voltage.

Assuming that as signal transition turns OFF transistor 115 opening circuiting coil 105, with transistor 116 OFF and coil 104 not connected to the tank circuit, the magnetic field set up by coil 105 starts to collapse accompanied by a voltage buildup at the collector of transistor 115. If the collector voltage goes more positive than the breakdown voltage of diode 117 or more negative than the breakdown voltage of diode 118, the corresponding diode breaks down completing a low impedance path therethrough. When transistor 116 is thereafter turned ON, coil 104 is connected between terminal point 106 and ground by way of the collector-to-emitter path of transistor 116. This, due to the mutual coupling of coils 104 and 105, tends to lower the voltage on the collector of transistor 115 to the voltage normally provided thereat when transistor 115 is nonconducting. Since, as previously described, the minimum breakdown voltage of Zener diodes 117 and 118 are chosen to be at least as great as the normal voltage, the Zener diodes cease conducting and only coil 104 remains connected to the tank circuit. The Zener diode thus opens up whereby only coil 104 is connected to the tank circuit. Accordingly, the energy lost is minimized and phase continuity is substantially maintained.

Although a specific embodiment of this invention has been shown and described, it will be understood that various modifications may be made without departing from the spirit of this invention and within the scope of the appended claims.

What is claimed is:

1. A resonant circuit for a frequency-shift oscillator comprising capacitive means, first and second coil portions coupled on a common core, a transistor switch associated with each of said coil portions for completing a path therethrough connecting said associated coil portion across said capacitive means, and a breakdown device connected across said transistor switch path.

2. A resonant circuit for a frequency-shift oscillator comprising capacitive means, a first and second coil coupled on a common core, switch means associated with each of said coils for connecting said associated coil across said capacitive means, and breakdown means responsive to a predetermined threshold voltage across said switch means for connecting said associated coil across said capacitive means.

3. A resonant circuit for a frequency-shift oscillator comprising capacitive means, a first and second coil coupled on a common core, a transistor switch associated with each of said coils for completing a path through the collector-to-emitter path thereof connecting said associated coil across said capacitive means, and a pair of oppositely poled Zener diodes connected in series across said collector-to-emitter path.

4. In a transmitter for converting binary data signals to frequency-shift signals, capacitive means, first and second coil portions mutually coupled on a common core, means associated with each of said coil portions for completing a path connecting said associated coil portion across said capacitive means, binary data signal responsive means for alternately enabling said connecting means and means responsive to a predetermined threshold voltage across at least a portion of said path for enabling said corresponding connecting means.

5. In a transmitter for converting binary data signals to frequency-shift signals, capacitive means, first inductive means, second inductive means, means for magnetically coupling said first inductive means and said second inductive means, a pair of switch means, each associated with one of said inductive means for connecting said associated one of said inductive means across said capacitive means, binary data signal responsive means for alternately enabling said pair of switch means, and breakdown means responsive to a predetermined threshold voltage across said switch means for connecting said associated inductive means across said capacitive means.

6. In a transmitter for converting binary data signals to frequency-shift signals, capacitive means, first inductive means, second inductive means, means for magnetically coupling said first inductive means and said second inductive means, a pair of switch means, each switch means of said pair connected in series with one of said inductor means across said capacitive means, binary data signal responsive means for alternately enabling said pair of switch means, and breakdown means shunting each of said switch means for connecting said associated inductive means across said capacitive means in response to a predetermined threshold voltage across said switch means.

References Cited by the Examiner

UNITED STATES PATENTS

| | | | |
|---|---|---|---|
| 2,230,557 | 2/1941 | Babik et al. ------ | 331—179 X |
| 2,617,035 | 11/1952 | Janssen et al. --------- | 331—179 |

OTHER REFERENCES

Nolis, W. M., "Dedundand Oscillator," IBM Technical Disclosure, vol. 5, No. 1–6–1962, p. 80.

Bowyer et al., "Analysis of Inherent Distortion in Asynchronous Frequency-Shift Modulators," Bell System Technical Journal, vol. 41, pp. 1695–1736, 11–1962/pp. 1695–1698, 1709–1712 and 1729–1730 relied on.

ROY LAKE, *Primary Examiner.*

A. L. BRODY, *Assistant Examiner.*